(12) United States Patent
Furukawa (10) Patent No.: US 9,089,914 B2
(45) Date of Patent: Jul. 28, 2015

(54) WIRE ELECTRIC DISCHARGE MACHINE HAVING FUNCTION FOR CONTROLLING MACHINING LIQUID TEMPERATURE

(71) Applicant: Fanuc Corporation, Yamanashi (JP)

(72) Inventor: Hiroyuki Furukawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 18 days.

(21) Appl. No.: 13/686,033

(22) Filed: Nov. 27, 2012

(65) Prior Publication Data

US 2013/0206730 A1 Aug. 15, 2013

(30) Foreign Application Priority Data

Feb. 13, 2012 (JP) ................. 2012-028626

(51) Int. Cl.
*B23H 1/02* (2006.01)
*B23H 7/04* (2006.01)
*B23H 7/20* (2006.01)
*B23H 7/36* (2006.01)
*B23H 1/10* (2006.01)

(52) U.S. Cl.
CPC .. *B23H 1/02* (2013.01); *B23H 7/04* (2013.01); *B23H 7/20* (2013.01); *B23H 7/36* (2013.01); *B23H 1/10* (2013.01)

(58) Field of Classification Search
CPC .............. B23H 1/02; B23H 1/10; B23H 7/04; B23H 7/20; B23H 7/36
USPC .................. 219/69.12, 69.13, 69.14; 700/162
See application file for complete search history.

(56) References Cited

U.S. PATENT DOCUMENTS

| 4,730,094 | A | * | 3/1988 | Aramaki et al. | ........... 219/69.14 |
| 5,175,408 | A |   | 12/1992 | Takashima |  |
| 5,428,201 | A | * | 6/1995 | Kaneko et al. | ............. 219/69.16 |

(Continued)

FOREIGN PATENT DOCUMENTS

| CN | 102019471 A | 4/2011 |
| DE | 3535546 | 4/1986 |

(Continued)

OTHER PUBLICATIONS

Extended European Search Report issued May 23, 2013 corresponding to EP Patent application No. 12193524.1.

(Continued)

*Primary Examiner* — Dana Ross
*Assistant Examiner* — James Sims, III
(74) *Attorney, Agent, or Firm* — Lowe Hauptman & Ham, LLP (57) ABSTRACT

A wire electric discharge machine has a function for controlling the machining liquid temperature. When it is predicted that the machining liquid temperature rises linearly, the machining liquid begins to be warmed at time $t_{5b}$ to reach machining liquid control temperature $T_2$ at human operation beginning time $t_2$. If the temperature rise at predetermined later time $t_8$ is greater than predicted, temperature rising suspended from time $t_8$ to a later time $t_9$. Temperature rising resumed at time $t_9$. This allows the machining liquid temperature to reach the machining liquid control temperature $T_2$ without wasting electric power.

2 Claims, 7 Drawing Sheets

(56) References Cited

U.S. PATENT DOCUMENTS

| | | | |
|---|---|---|---|
| 6,008,461 A | 12/1999 | Iezawa et al. | |
| 6,396,021 B1 * | 5/2002 | Sato et al. | 219/69.12 |
| 6,437,277 B1 | 8/2002 | Moro et al. | |
| 6,445,972 B1 * | 9/2002 | Takegahara et al. | 700/162 |
| 7,465,899 B2 * | 12/2008 | Kita et al. | 219/69.12 |
| 8,217,296 B2 * | 7/2012 | Kawarai et al. | 219/69.14 |
| 8,404,991 B2 * | 3/2013 | Kasai et al. | 219/69.14 |
| 2004/0099640 A1 * | 5/2004 | Nishio | 219/69.16 |
| 2004/0238417 A1 * | 12/2004 | Arakawa et al. | 210/85 |
| 2005/0263493 A1 * | 12/2005 | Kurihara et al. | 219/69.12 |

FOREIGN PATENT DOCUMENTS

| | | | |
|---|---|---|---|
| EP | 0476153 A1 | 3/1992 | |
| EP | 1862245 A2 | 12/2007 | |
| JP | 61-293723 A | 12/1986 | |
| JP | 61-297033 A | 12/1986 | |
| JP | 62114825 A | 5/1987 | |
| JP | 62181827 A | 8/1987 | |
| JP | 2124228 A | 5/1990 | |
| JP | 3294120 A | 12/1991 | |
| JP | 10315057 A | 12/1998 | |
| JP | 2010-105101 A | 5/2010 | |
| JP | 2011098416 A | 5/2011 | |

OTHER PUBLICATIONS

Decision to Grant a Patent for Patent Application No. 2012-028626 dispatched Feb. 26, 2013.

Office Action mailed Mar. 5, 2014, corresponds to Chinese patent application No. 201310051148.3.

* cited by examiner

WIRE ELECTRIC DISCHARGE MACHINE HAVING FUNCTION FOR CONTROLLING MACHINING LIQUID TEMPERATURE

RELATED APPLICATIONS

The present application claims priority from, Japanese Application No. 2012-028626, filed Feb. 13, 2012, the disclosure of which is hereby incorporated by reference herein in its entirety.

BACKGROUND OF THE INVENTION

1. Field of the Invention

The present invention relates to temperature control of machining liquid in a wire electric discharge machine.

2. Description of the Related Art

A wire electric discharge machine machines a workpiece to a desired shape by generating electric discharge by applying a voltage across a machining gap between a wire electrode and the workpiece while changing the relative position of the wire electrode with respect to the workpiece. Dimensional accuracy, perpendicularity, or angle accuracy is typically required of the machining result of the workpiece. To achieve the desired machining result, it is important to control the temperature of the machining liquid.

Temperature control of the machining liquid is important because the machining accuracy demanded of the wire electric discharge machine sometimes reaches the order of several microns in high accuracy machining, although it depends on the material, thickness, etc., of the workpiece. Any deformation of the workpiece due to variations in machining liquid temperature would degrade the machining accuracy with unacceptable dimensional error.

Variations in machining liquid temperature in the normally running wire electric discharge machine are mainly caused by the heat (temperature rise) produced during electric discharge machining. A technique for keeping constant the machining liquid temperature is known from Japanese Patent Application Laid-Open No. 2-124228 which relates to a machining liquid cooler. This technique suppresses the rise of the machining liquid temperature due to heat generated during machining. In contrast to the technique disclosed by Japanese Patent Application Laid-Open No. 2-124228, a technique for raising the machining liquid temperature is known from Japanese Patent Application Laid-Open No. 61-293723. The prior art techniques disclosed in Japanese Patent Applications Laid-Open Nos. 2-124228 and 61-293723 are techniques for controlling the machining liquid temperature in the wire electric discharge machine in the normal active state.

It is assumed here that, after being active, the wire electric discharge machine is inactivated for a predetermined time and then reactivated. In the inactive state, the machine is unattended and human operation of the machine (referred to hereinafter as "operation" for short) is not performed. In the inactive state, a machining liquid temperature regulator is stopped and the minimum electric power required to maintain the machine is consumed.

Figure 5:
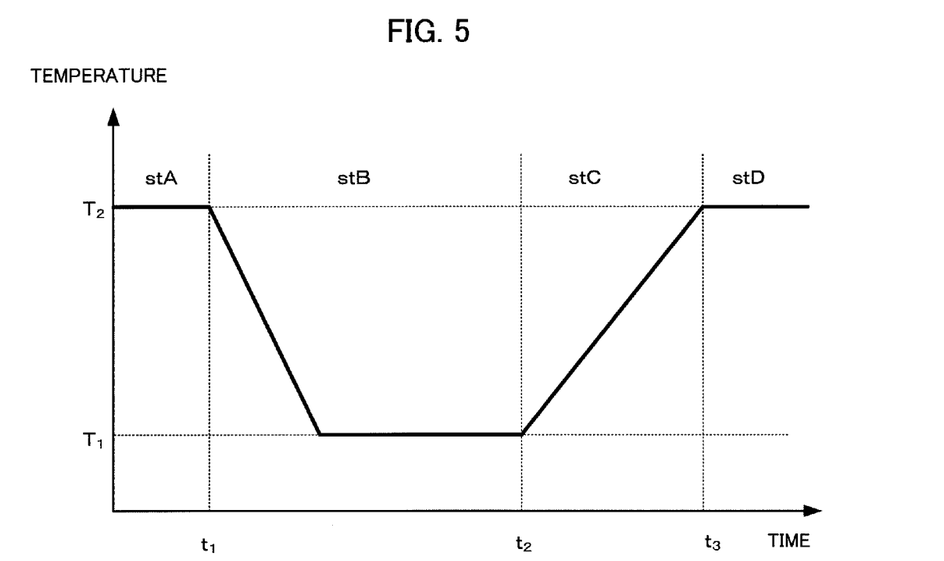
FIG. 5 is a graph illustrating a change of the machining liquid temperature in a conventional wire electric discharge machine when the machine's ambient temperature is lower than a control target temperature of the machining liquid in the normal active state.

FIG. 5 shows an example in which the machine's ambient temperature is lower than a control target temperature of the machining liquid in the normal active state (referred to hereinafter as "machining liquid control temperature"). In this case, the machining liquid temperature in the inactive state lowers toward the ambient temperature and is controlled to reach the machining liquid control temperature after operation begins. As shown in FIG. 5, the states of the machine are classified into three:

stA: Normal active state. The machining liquid temperature is maintained at the machining liquid control temperature.

stB: Inactive state. Temperature control of machining liquid is stopped.

stC: Preparation-for-reactivation state. Restored from the inactive state, temperature control of machining liquid is resumed by the machining liquid circulating pump.

stD: Normal active state. The machining liquid temperature has reached the machining liquid control temperature and the normal active state is restored (i.e., stA and stD are identical states).

The labels in FIG. 5 have the following meanings:

$T_1$: Machining liquid temperature when the machine is reactivated, $T_2$: Machining liquid control temperature, $t_1$: Time at which the machine is inactivated, $t_2$: Time at which preparation to reactivate the machine starts, and $t_3$: Time at which the machining liquid temperature reaches the machining liquid control temperature.

If the machining of workpiece is started in the preparation-for-reactivation state stC before the machining liquid temperature reaches the machining liquid control temperature $T_2$, the machining liquid temperature at the start of machining is different from the temperature at the end of machining. Temperature variations of the machining liquid deform the workpiece, resulting in a machined product with a significant dimensional error. To avoid any machining result with unacceptable dimensional error due to premature machining started in the preparation-for-reactivation state (stC), it is arranged that machining does not start before the machining liquid temperature reaches the machining liquid control temperature.

To raise the machining liquid temperature from a machining liquid temperature lower than the machining liquid control temperature as shown in FIG. 5, there is a method using a machining liquid circulating pump, for example. However, this method does not efficiently raise the machining liquid temperature, because it uses the heat generated by the operation of the machining liquid circulating pump, i.e., by the secondary effect of the operation of the machining liquid circulating pump. To aim only at raising the machining liquid temperature, a warming device such as a heater as disclosed by Japanese Patent Application Laid-Open No. 61-293723 can raise the machining liquid temperature to the control temperature in a shorter time.

Figure 6:
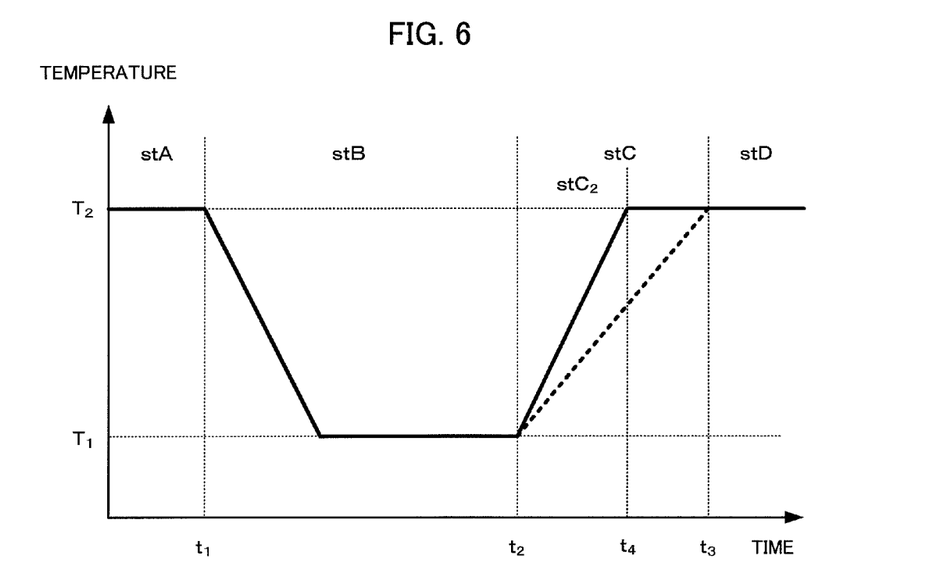
FIG. 6 is a graph illustrating that the machining liquid is heated at the control target temperature in a shorter time using a prior art warming device.

FIG. 6 is a schematic diagram showing that a warming device can shorten the preparation-for-reactivation state (stC) from $t_3$-$t_2$ to $t_4$-$t_2$.

The labels used in FIG. 6 have the following meanings:

$stC_2$: Preparation-for-reactivation state (with warming device), and $t_4$: Time at which the machining liquid control temperature is reached (with warming device).

In the preparation-for-reactivation state above, the machine has been restored from the inactive state and machining liquid temperature control is resumed by the warming device and the machining liquid circulating pump.

The description for FIG. 5 applies to the other labels in FIG. 6 common to those in FIG. 5.

Even if the warming device is employed, the machining liquid temperature begins to be raised by the preparation-for-reactivation operation. A certain preparation-for-reactivation time period exists, therefore, after the operation begins until the machining liquid control temperature is reached, during which machining cannot produce a machining result with high accuracy.

Figure 7:
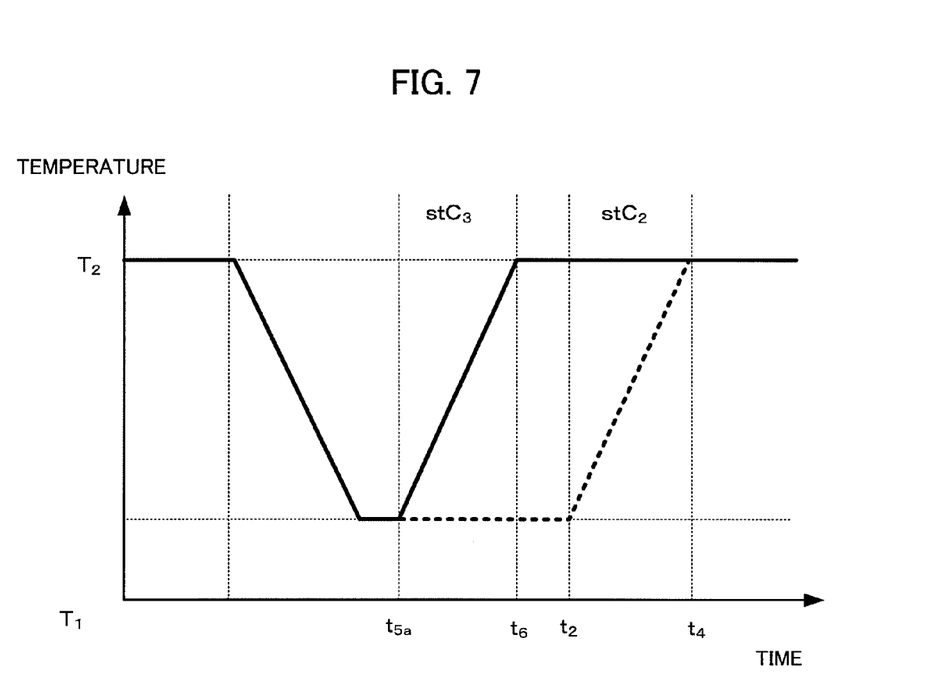
FIG. 7 illustrates a technique for controlling the machining liquid temperature disclosed by a prior art document, comparing the cases in which a timer is used and not used.

To solve such a problem, a technique for controlling the machining liquid temperature using a timer function prior to the beginning of operation is known from Japanese Patent Application Laid-Open No. 61-297033. FIG. 7 is a schematic diagram showing the technique for controlling the machining liquid temperature using the timer function disclosed by Japanese Patent Application Laid-Open No. 61-297033, in comparison with the case in which no timer function is used.

The labels used in FIG. 7 have the following meanings:

$stC_2$: Preparation-for-reactivation state (without timer function), $stC_3$: Preparation-for-reactivation state (with timer function), $t_{5a}$: Preparation-for-reactivation start time (with timer function), $t_6$: Time at which the control temperature is reached (with timer function), $t_2$: Preparation-for-reactivation start time (without timer function), and $t_4$: Time at which the control temperature is reached (without timer function).

The preparation-for-reactivation start time (without timer function) above is the time at which human operation begins.

The description for FIG. 5 applies to the other labels in FIG. 7 common to those in FIG. 5.

The temperature control of machining liquid shown in FIG. 7 will now be described. It is assumed that operation begins at time $t_2$. When temperature control of machining liquid is resumed at time $t_{5a}$ in a machine having the timer function, the machining liquid control temperature $T_2$ is reached at time $t_6$. Since time $t_6$ is earlier than the operation beginning time, machining can be started immediately after the operation begins. On the other hand, when the machining liquid temperature begins to be raised at time $t_2$ in a machine having no timer function, machining cannot be started until the machining liquid control temperature $T_2$ is reached at time $t_4$.

In this way, in the machine having the timer function, machining can be started without delay after the operation begins. This technique requires, however, for the operator to set the time for the timer function. This involves a problem that it is difficult to precisely determine how much the machining liquid temperature has changed during the inactive period, how much the current temperature deviates from the target temperature, and how much time is required to reach the target temperature.

Figure 8:
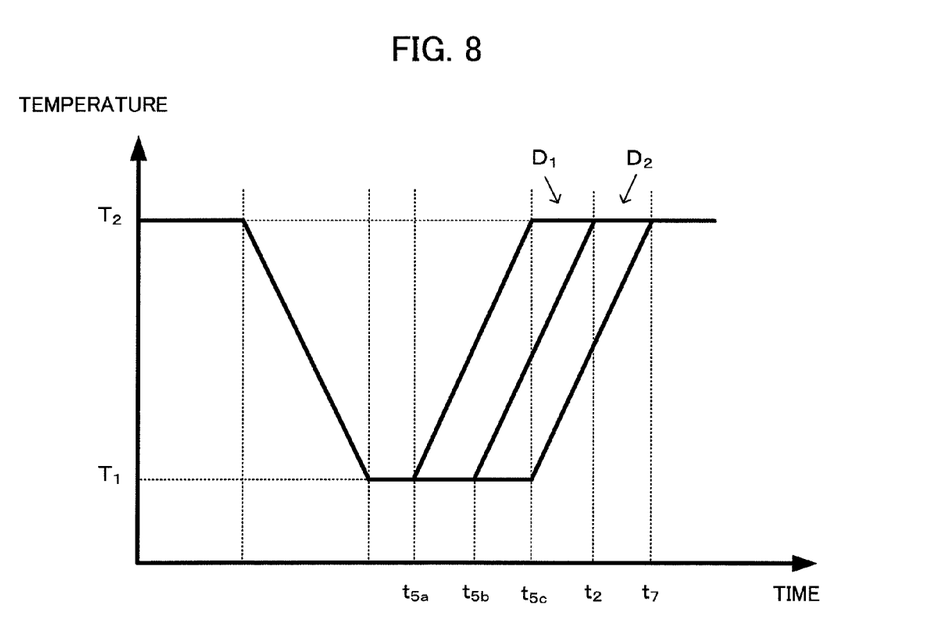
FIG. 8 illustrates a prior art technique for controlling the machining liquid temperature by varying the timing for enabling the timer function.

FIG. 8 illustrates a prior art technique for controlling the machining liquid temperature by varying the timing for enabling the timer function. It is assumed here that operation begins at time $t_2$. The timer function is enabled at time $t_{5a}$, $t_{5b}$, or $t_{5c}$. When preparation-for-reactivation starts at time $t_{5a}$, the control temperature is reached before the operation begins and electric power is wasted by the operation of the machining liquid circulating pump until time $t_2$ (i.e., during period $D_2$). When preparation-for-reactivation starts at time $t_{5b}$, the machining liquid control temperature is reached at time $t_2$. Since the operation begins at time $t_2$, the warming device and machining liquid circulating pump do not uselessly operate. When preparation-for-reactivation starts at time $t_{5c}$, the machining liquid control temperature cannot be reached by the time the operation begins, so machining cannot be started until the machining liquid control temperature is reached at time $t_7$ (i.e., during period $D_3$). Since in the technique disclosed by Japanese Patent Application Laid-Open No. 61-297033, the timer may be set to any point in time, it is not clear to which of time $t_{5a}$, $t_{5b}$, or $t_{5c}$ in FIG. 8 the timer is set. It is impossible to set the timer precisely by predicting in advance how much the machining liquid temperature changes during the inactive period.

A technique for solving this problem is disclosed by Japanese Patent Application Laid-Open No. 2010-105101. This technique relies on a temperature measuring means for measuring the temperature at or near a machine component or part. If the machining liquid is circulated for pre-conditioning before the program starts, the time required for pre-conditioning circulation is predicted using the difference between the temperature measured by the measuring means and the preset machining liquid temperature and then the pre-conditioning circulation is performed for the predicted time period until the program starts.

The technique disclosed by Japanese Patent Application Laid-Open No. 2010-105101, however, does not take into consideration the amount of machining liquid. The time required to change the machining liquid temperature varies with the amount of machining liquid. At a site where the wire electric discharge machine is actually used, even if the machining liquid is stored to the maximum capacity when the machine is installed, the amount of machining liquid may change due to evaporation etc., so it is quite unlikely that the amount of machining liquid is the same in all wire electric discharge machines in the world. The timer function cannot be operated at an appropriate time, therefore, using only the table in the technique disclosed by Japanese Patent Application Laid-Open No. 2010-105101.

Furthermore, according to the technique disclosed by Japanese Patent Application Laid-Open No. 2010-105101, temperature control of the machining liquid remains the same after the control is started. Since there is no information of the amount of machining liquid as described above, the control target temperature could be reached earlier than predicted. When the control target temperature is reached earlier than predicted, electric power would be wasted for machining liquid circulation etc. until the operation begins.

Although the above description is about the case in which the machining liquid temperature in the inactive state is lower than the control temperature, a similar description applies to the case in which the machining liquid temperature in the inactive state is higher than the control temperature.

SUMMARY OF THE INVENTION

One object of the present invention is to provide a wire electric discharge machine having a function for controlling the machining liquid temperature by determining by calculation or from a table the time required to control the machining liquid temperature after the wire electric discharge machine is inactivated, automatically enabling a timer function at an optimum time before an operation begins, starting preparation for reactivation, and activating a temperature regulator and a pump for circulating the machining liquid.

The wire electric discharge machine having the function for controlling the machining liquid temperature according to the present invention machines the workpiece to a desired shape by circulating the machining liquid between a machining liquid tank and a machining vessel and generating electric discharge by applying a voltage across a machining gap between a wire electrode and the workpiece immersed in the machining liquid stored in the machining vessel while changing the relative position of the wire electrode with respect to the workpiece.

A first embodiment of this wire electric discharge machine includes an operation beginning time setting unit for setting the time at which operation of the wire electric discharge machine begins, a machining liquid temperature setting unit for setting a control temperature of the machining liquid at the operation beginning time, a machining liquid temperature measuring unit for measuring the machining liquid temperature, an ambient temperature measuring unit for measuring an ambient temperature around the wire electric discharge machine, a temperature regulation time calculating unit for calculating a temperature regulation time required to regulate the machining liquid temperature on the basis of the quantity of heat required to regulate the temperature of the machining liquid, stored in the machining liquid tank up to its maximum capacity, to the control temperature from the measured machining liquid temperature and ambient temperature, a quantity of heat loss, and the capacity of a temperature regulator to be used for the temperature regulation, a first remaining time calculating unit for calculating a first remaining time left before the operation beginning time calculated by the operation beginning time setting unit since the time at which the temperature regulation time calculating unit calculates the temperature regulation time, a temperature regulation control starting unit for starting temperature regulation using the temperature regulator when the temperature regulation time calculated by the temperature regulation calculating unit becomes equal to or exceeds the first remaining time, a temperature regulation time recalculating unit for determining a rate of change of the machining liquid temperature by measuring a machining liquid temperature after a predetermine time elapses since the temperature regulation control starting unit starts temperature regulation and then recalculating from the determined rate of change of the machining liquid temperature a time required to reach the control temperature, a second remaining time calculating unit for calculating a second remaining time left before the operation beginning time since the time at which the temperature regulation time recalculating unit calculates the recalculated temperature regulation time, and a temperature regulation suspending unit for setting a time for resuming temperature regulation after suspending temperature regulation for a tie corresponding to a difference between the second remaining time and the recalculated temperature regulation time when the recalculated temperature regulation time is shorter than the second remaining time. When the recalculated temperature regulation time is shorter than the second remaining time, temperature regulation of the machining liquid is resumed after the time set by the temperature regulation suspending unit, but when the recalculated temperature regulation time is not shorter than the second remaining time, temperature regulation of the machining liquid continues.

A second embodiment of this wire electric discharge machine includes an operation beginning time setting unit for setting the time at which operation of the wire electric discharge machine begins, a machining liquid temperature setting unit for setting a control temperature of the machining liquid at the operation beginning time, a table storage section in which a table listing time lengths required to regulate the temperature of the machining liquid, stored in the machining liquid tank up to its maximum capacity, to the control temperature is stored, a machining liquid temperature measuring unit for measuring a machining liquid temperature, a temperature regulation time calculating unit for calculating a temperature regulation time required to regulate the temperature on the basis of the measured machining liquid temperature and the table, a first remaining time calculating unit for calculating a first remaining time left before the operation begins since the time at which the temperature regulation time calculating unit calculates the temperature regulation time, a temperature regulation control starting unit for starting temperature regulation when the temperature regulation time becomes equal to or exceeds the first remaining time, a temperature regulation time recalculating unit for determining a rate of temperature change by measuring a machining liquid temperature after a predetermine time elapses since the temperature regulation control starting unit starts temperature regulation and then recalculating the time required to reach the control temperature from the rate of temperature change, a second remaining time calculating unit for calculating a second remaining time left before the operation begins since the time at which the temperature regulation time recalculating unit calculates the recalculated temperature regulation time, and a temperature regulation suspending unit for setting a time for resuming temperature regulation after suspending temperature regulation for a time corresponding to a difference between the second remaining time and the recalculated temperature regulation time when the recalculated temperature regulation time is shorter than the second remaining time. When the recalculated temperature regulation time is shorter than the second remaining time, temperature regulation of the machining liquid is resumed at the time set by the temperature regulation suspending unit, and, when the recalculated temperature regulation time is not shorter than the second remaining time, the temperature regulation of the machining liquid continues.

According to the present invention, a wire electric discharge machine having a function for controlling the machining liquid temperature by determining by calculation or from a table the time required to control the machining liquid temperature after the wire electric discharge machine is inactivated, automatically enabling a timer function at an optimum time before the operation begins, starting preparation for reactivation, and activating a temperature regulator and a pump for circulating the machining liquid.

BRIEF DESCRIPTION OF THE DRAWINGS

These and other objects and features will be apparent from the following description of embodiments with reference to the appended drawings, in which.

DETAILED DESCRIPTION OF THE PREFERRED EMBODIMENTS

Figure 1:
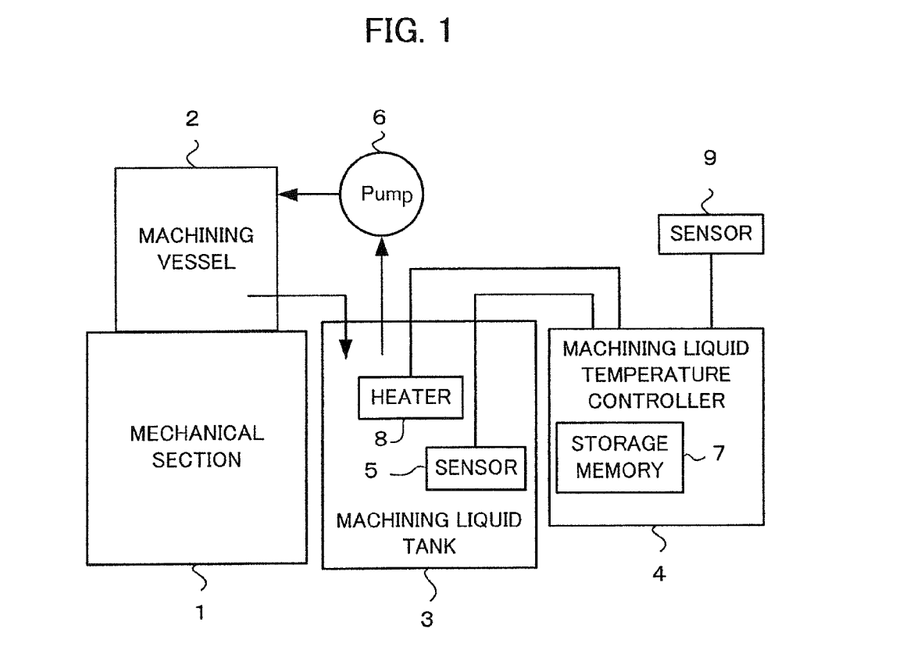
FIG. 1 schematically illustrates the configuration of a wire electric discharge machine according to an embodiment of the present invention.

Referring first to FIG. 1, a wire electric discharge machine having a function for controlling the machining liquid temperature according to the present invention will be generally described.

The wire electric discharge machine machines a workpiece to a desired shape by generating electric discharge by applying a voltage across a machining gap between a wire electrode and the workpiece immersed in the machining liquid stored in a machining vessel 2 while changing the relative position of the wire electrode with respect to the workpiece.

The wire electrode (not shown) runs downward, guided by upper and lower wire guides appropriately spaced from each other in the machining vessel 2. A workpiece (not shown) is positioned along the running path of the wire electrode between the wire guides. The wire electric discharge machine (not shown) performs electric discharge machining by generating electric discharge in a machining gap between the wire electrode and the workpiece. The machining vessel 2 stores the machining liquid supplied from a machining liquid tank 3. The machining liquid in the machining vessel 2 contains machining debris produced by electric discharge machining and flows into a machining liquid tank 3.

The machining liquid in the machining liquid tank 3 is pumped out by a machining liquid circulating pump 6 and supplied to the machining vessel 2. In this way, the machining liquid circulating pump 6 circulates the machining liquid through the machining vessel 2 and machining liquid tank 3. The machining liquid tank 3 generally includes a waste water vessel for collecting and storing the machining liquid coming from the machining vessel 2 and a freshwater vessel for storing machining liquid cleared of machining debris from the waste water vessel. The machining liquid in the freshwater vessel is pumped out by the machining liquid circulating pump 6 and supplied to the machining vessel 2.

A temperature regulator such as heater 8 regulates the machining liquid temperature to a preset temperature. By circulating the machining liquid that has been regulated to a machining liquid control temperature by the heater 8, it is possible to reduce thermal displacement at machine components or parts that circulate the machining liquid and thus reduce machining error due to expansion or contraction of the workpiece. Temperature regulators used here include the heater 8 for warming the machining liquid and a cooler (not shown) for cooling the machining liquid.

A machining liquid temperature detecting sensor 5 measures the temperature of the machining liquid stored in the machining liquid tank 3 and outputs measurement signals to a machining liquid temperature controller 4. A room temperature sensor 9 measures the air temperature in the environment in which the wire electric discharge machine is installed. Signals of the measured temperatures are output to the machining liquid temperature controller 4. The machining liquid temperature controller 4 includes a processor (CPU), memory, etc. required to execute a control program. The machining liquid temperature controller 4 further includes a timer function used for controlling the machining liquid temperature, and a storage memory 7 for storing data required to control the machining liquid temperature, such as the operation beginning time, the machining liquid control temperature, and the maximum storage capacity of the machining liquid tank 3 for storing the machining liquid. Data of the time required for the machining liquid to reach the machining liquid control temperature when the machining liquid is stored in the machining liquid tank 3 to its maximum capacity may be stored in a table format in the storage memory 7. In short, the storage memory 7 may include a table storage section. The machining liquid controller may be a separate device, or a numeric controller for controlling the wire electric discharge machine may be provided with a function for controlling the machining liquid temperature.

Next, the temperature control of machining liquid according to the present invention using the wire electric discharge machine described above will be described. According to the present invention, after the wire electric discharge machine is inactivated, the time required to control the machining liquid temperature is determined by calculation or from a table, a timer function is automatically enabled at an appropriate timing before the operation begins, preparation for reactivation is started, and a temperature regulator and a pump for circulating the machining liquid are activated to control the machining liquid temperature. Then, the machining liquid temperature is measured after a predetermine time elapses since the temperature control of machining liquid starts. If it is predicted that the control target temperature is reached before the time determined by calculation or from the table, the temperature regulation is suspended, the time required for temperature regulation is determined again by calculation or from the table, and a temperature regulation start time is set again.

Considering the timing for enabling the timer function, since the amount of machining liquid subject to temperature control is the same, it is assumed that the electric power consumed for temperature regulation is identical regardless of the time at which the preparation for reactivation is started, as long as the required amount of temperature change is equal. To control the machining liquid temperature, however, it is necessary to activate the machining liquid circulating pump 6 to keep constant the machining liquid temperature. More specifically, when the machining liquid reaches the control temperature before the operation begins, it is necessary to keep the machining liquid circulating pump 6 functioning after the control temperature is reached until the operation begins, thereby wasting electric power. On the other hand, when the preparation for reactivation is started later and the machining liquid temperature does not reach the control temperature when the operation begins, electric power is not wasted but machining cannot be performed until the control temperature is reached. It is ideal that the timer function is set such that the machining liquid reaches the control temperature exactly when the operation begins. With this, the control temperature is reached when the operation begins, with minimum power consumption.

Figure 2:
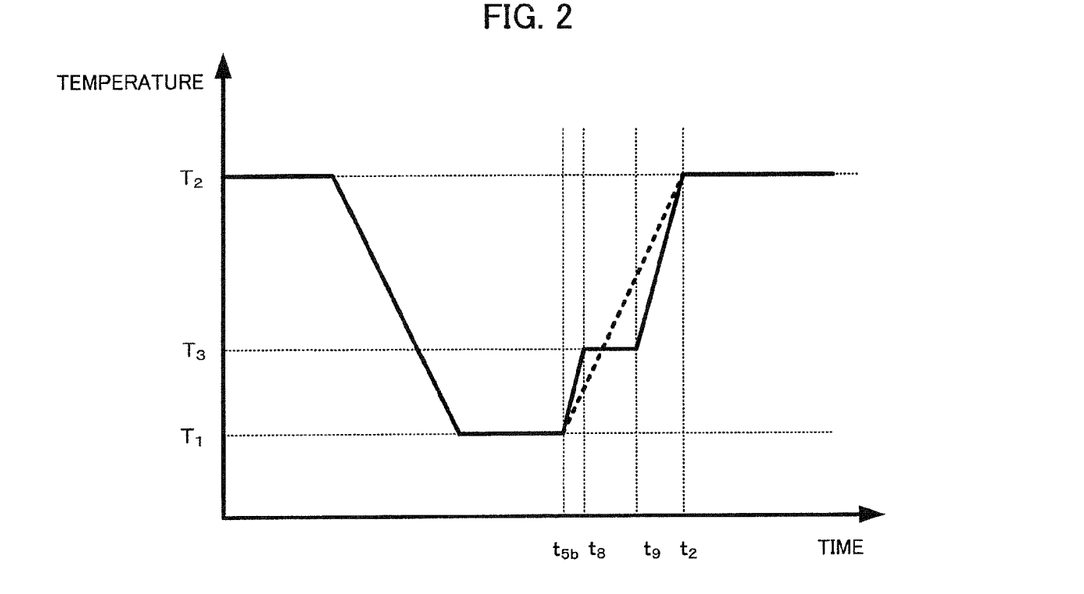
FIG. 2 illustrates temperature control according to the present invention.

Referring now to FIG. 2, first and second methods for controlling the machining liquid temperature according to the present invention will be described.

(First Method)

The machining liquid in the machining liquid tank 3 is fed to the machining vessel 2 by the machining liquid circulating pump 6. The machining liquid fed to the machining vessel 2 returns to the machining liquid tank 3. The machining liquid temperature controller 4 monitors the temperature of the machining liquid in the machining liquid tank 3 using the machining liquid temperature detecting sensor 5 and activates the temperature regulator, which is the heater 8, if necessary. Various numerical data stored in the storage memory 7 are used to activate the temperature regulator at an optimum time. According to the first method, the room temperature sensor 9 for measuring the machine's ambient temperature is used to control the machining liquid temperature.

To start preparation for reactivation at an ideal preparation-for-reactivation start time $t_{5b}$ at which the timer starts, a human operation beginning time $t_2$ is preset, i.e., stored in the storage memory 7. In addition, the quantity of heat required for the machining liquid temperature to reach the machining liquid control temperature is calculated from the machining liquid volume (or maximum storage capacity of the machining liquid tank 3) and the machining liquid control temperature of the machining liquid stored in the storage memory 7, or data of the machining liquid temperature detected by the machining liquid temperature detecting sensor 5.

Additionally, the quantity of heat loss due to heat dissipation is determined from the stored total surface area of the machining liquid tank 3 (i.e., sum of the surface areas of the side(s) and bottom of the tank 3) and the surface area of the machining liquid. Since information of the difference between the machining liquid temperature and the ambient temperature is required to calculate the quantity of heat dissipation, the ambient temperature in the environment in which the machine (i.e., wire electric discharge machine) is installed is measured by the room temperature sensor 9. The machining liquid temperature is measured by the machining liquid temperature detecting sensor 5 as described above.

The preparation-for-reactivation start time $t_{5b}$ for causing the machining liquid temperature to reach the control temperature at the preset operation beginning time $t_2$ is determined from the quantity of heat required to raise the machining liquid temperature, heat loss due to dissipation, and the preset operation beginning time. With this, machining can be started immediately after the operation begins, without wasting electric power. In this case, since it is necessary to determine the preparation-for-reactivation start time $t_{5b}$, the machining liquid temperature detecting sensor 5, room temperature sensor 9, and the computing unit operate during the inactive period.

As described above, the quantity of heat required to control the machining liquid temperature is the sum of the quantity of heat required to eliminate the difference between the machining liquid temperature detected by the machining liquid temperature detecting sensor 5 and the machining liquid control temperature, which is the target temperature to be controlled, and the quantity of heat that is lost while the machining liquid temperature is being controlled when the machining liquid temperature is different from the ambient temperature. The larger the temperature difference is, the more the quantity of heat is lost. The quantity of heat required to raise the machining liquid temperature can be determined by calculation from the data of specific heat, density, volume, and amount of temperature change of the machining liquid. The quantity of heat loss (quantity of heat dissipation) can be determined from the heat loss coefficient, the surface area of the machining liquid container (i.e., machining liquid tank), and the surface area of the machining liquid.

The first method for controlling the machining liquid temperature will now be described using mathematical expressions.

The quantity of heat $P_1$ required to change the machining liquid temperature can be expressed by equation (1) below, where $C_1$ is specific heat of the machining liquid, $d_1$ is machining liquid density, $V_1$ is machining liquid volume, and $\Delta T$ is the amount of temperature change. Volume $V_1$ may be a fixed volume of the machining liquid, or can be monitored in more detail using a machining liquid amount sensor provided with a liquid level sensor or the like. Alternatively, volume $V_1$ may be the maximum machining liquid volume that can be stored in the machining liquid tank 3.

$$P_1 = C_1 \times d_1 \times V_1 \times \Delta T \tag{1}$$

The quantity of heat $P_2$ required to change the temperature of the container storing the machining liquid can be expressed by equation (2) below, where $C_2$ is specific heat of the container, $d_2$ is container density, $V_2$ is container volume, and $\Delta T$ is the amount of temperature change. Here, the container represents the machining vessel 2 and machining liquid tank 3. Since the container stores the machining liquid, it is assumed that the temperature of the container is equal to the temperature of the machining liquid, and therefore the required temperature change is also equal.

$$P_2 = C_2 \times d_2 \times V_2 \times \Delta T \tag{2}$$

The quantity of heat loss $P_3$ of the machining liquid can be expressed by equation (3) below and the quantity of heat loss $P_4$ of the machining liquid container can be expressed by equation (4) below, where $Q_1$ is the radiation heat loss coefficient of the machining liquid, $S_1$ is machining liquid surface area, $P_3$ is heat loss (quantity of heat) of the machining liquid, $Q_2$ is the radiation heat loss coefficient of the machining liquid tank, $S_2$ is tank surface area, and $P_4$ is heat loss (quantity of heat) of the tank. Since information on the difference between the machining liquid temperature and the machine's ambient temperature is required to determine the radiation heat loss coefficients $Q_1$ and $Q_2$, the temperature information obtained from the machining liquid temperature detecting sensor 5 and room temperature sensor 9 is used.

$$P_3 = Q_1 \times S_1 \tag{3}$$

$$P_4 = Q_2 \times S_2 \tag{4}$$

The total quantity of heat $P_5$ required to control the temperature can be expressed by equation (5) below:

$$P_5 = P_1 P_2 P_3 P_4 \tag{5}$$

The time $t_{11}$ required to raise the temperature using a heater with a capacity A can be determined using equation (6) below:

$$t_{11} = \frac{P_5}{A} \tag{6}$$

By setting the timer function such that the temperature regulator such as heater 8 is activated earlier by time $t_{11}$ before the preset operation beginning time, the machining liquid can reach the target temperature with minimum power consumption by the time the operation begins.

In calculating the total quantity of heat given to the machining liquid from the temperature regulator such as heater 8 on the basis of the quantity of heat required to control the machining liquid temperature and the quantity of heat loss due to dissipation, the total quantity of heat can be handled as the quantity depending on the machining liquid volume, because the values other than the machining liquid volume are specific to the material. Accordingly, the current volume of the machining liquid can be determined from the temperature rise during a predetermined time since the temperature control of the machining liquid starts. With this, the machining liquid temperature can be controlled without using a machining liquid volume measuring sensor and the time required to raise the machining liquid temperature can be recalculated from the calculated machining liquid volume, so the machining liquid can reach the machining liquid control temperature at an exact time.

In case where the machining liquid temperature is regulated without using a machining liquid quantity sensor, the maximum capacity of the machining liquid tank 3 is used as the volume of the machining liquid in the calculation for determining the preparation-for-reactivation start time $t_{5b}$ to facilitate the calculation. Since this calculation is based on the machining liquid volume that is most difficult to warm, the machining liquid control temperature can be reached by the human operation beginning time $t_2$, irrespective of the actual machining liquid volume. If the machining liquid control temperature is reached before the human operation beginning time $t_2$, however, the machining liquid circulating pump 6 and other units would be activated and electric power would be wasted.

Hence, temperature rise is predicted as shown by the dashed line in FIG. 2, and temperature rising started at the preparation-for-reactivation start time $t_{5b}$; when the machining liquid temperature rises faster than predicted, reaching $T_3$ at a predetermined later time $t_8$ at which the controlled situation of the machining liquid temperature is checked, temperature rising suspended until the preparation-for-reactivation resumption time $t_9$, the time required to temperature regulation is recalculated, and temperature regulation is suspended. By resuming temperature regulation at the recalculated preparation-for-reactivation resumption time $t_9$, the control temperature can be reached at the exact time. Here, since the time required for temperature regulation is calculated on the basis of the "maximum amount of the machining liquid that can be stored in the machining liquid tank 3", the machining liquid control temperature can be reached without delay at the operation beginning time $t_2$ without wasting electric power. Although the actual machining liquid temperature does not change linearly due to heat dissipation, it is expressed in a linear function as in FIG. 2 for simplicity. Since there may be a heat loss that cannot be figured out precisely in actual situations in which the machining liquid temperature is controlled, expressing the actual temperature change as a function as in FIG. 2 advantageously enables precise temperature control.

In the foregoing, the machining liquid temperature in the inactive state is lower than the control temperature; when the machining liquid temperature in the inactive state is higher than the control temperature, temperature control is performed similarly as described above, but a cooler is used instead as the temperature regulator to take heat from the machining liquid. In the inactive state, the machining liquid temperature regulator is stopped and the minimum power for maintaining the machine is consumed.

Figure 3A:
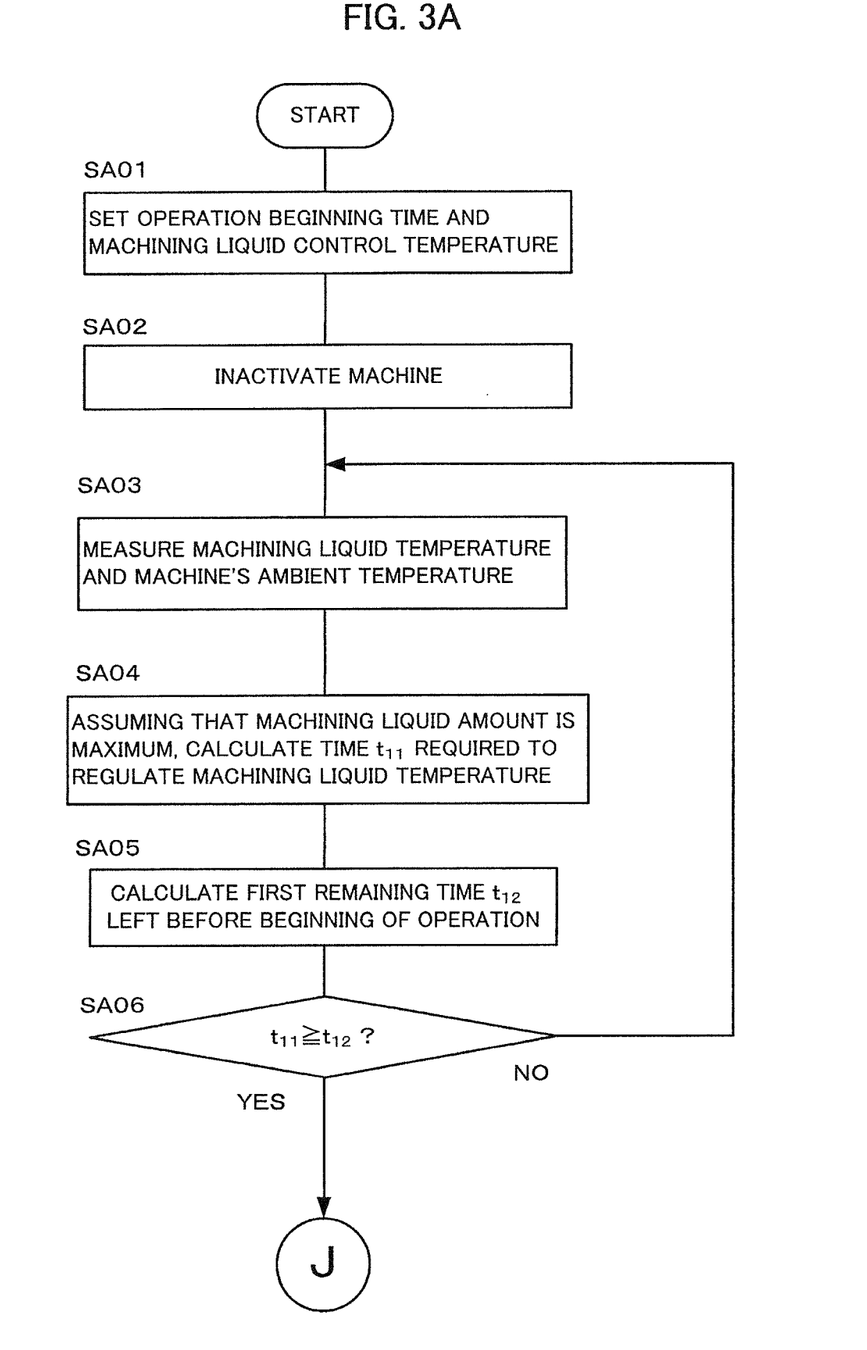
FIGS. 3A and 3B are flowcharts illustrating the procedure according to a first method for controlling the machining liquid temperature.
Figure 3B:
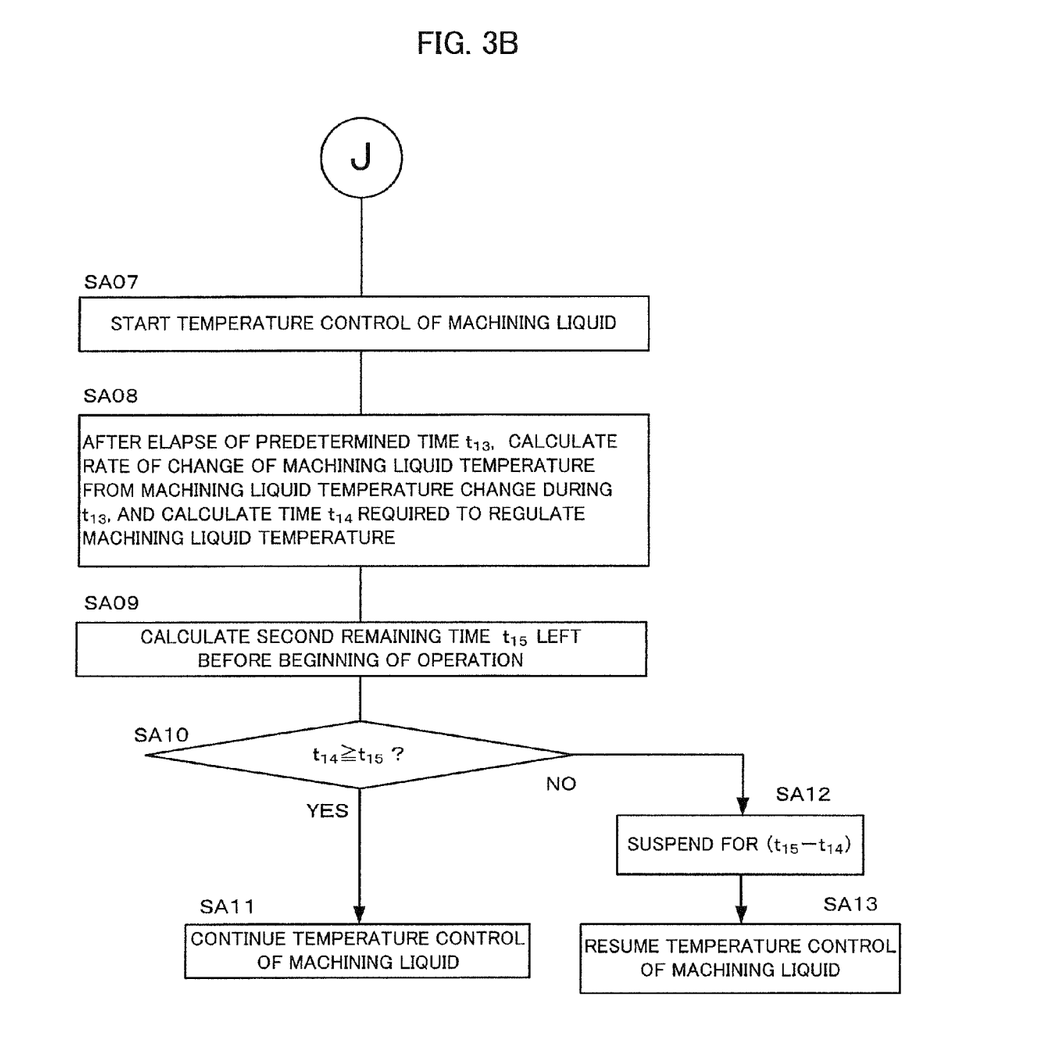

FIG. 3 is a flowchart illustrating a procedure for controlling the machining liquid temperature according to the first method. Description will be given below in the order of steps.
[Step SA01] An operation beginning time is read in. For example, the operation beginning time input and stored by an operator etc. through an input unit of the wire electric discharge machine is read in by the machining liquid temperature controller.
[Step SA02] The machine is inactivated. The machining liquid temperature controller stops controlling the machining liquid temperature.
[Step SA03] The machining liquid temperature and the machine's ambient temperature are measured and data of the machining liquid temperature and machine's ambient temperature are obtained. The machining liquid temperature is measured using the machining liquid temperature detecting sensor 5 and the machine's ambient temperature is measured using the room temperature sensor 9.
[Step SA04] Assuming that the amount of machining liquid is the maximum, the time $t_{11}$ required to regulate the machining liquid temperature (i.e., the time required to cause the machining liquid temperature to reach the machining liquid control temperature) is calculated. The time $t_{11}$ can be calculated using equations (1)-(6) above.
[Step SA05] A first remaining time $t_{12}$ left before the beginning of operation is calculated.
[Step SA06] Decision is made whether or not the first remaining time $t_{12}$ becomes equal to or smaller than time $t_{11}$; if equal to or smaller than time $t_{11}$ ($t_{11} \geq t_{12}$) (decision YES), the process proceeds to Step SA07; if not equal to or smaller than time $t_{11}$ ($t_{11} < t_{12}$) (decision NO), the process returns to Step SA03. If $t_{11} < t_{12}$ (decision NO), the process may return to Step SA03 after a predetermined time elapses, to reduce the number of calculations of time lengths $t_{11}$, $t_{12}$.
[Step SA07] Temperature control (regulation) of the machining liquid is started.
[Step SA08] To check the controlled situation of the machining liquid temperature, time $t_{14}$ required to regulate the machining liquid temperature is calculated by calculating the rate of change of the machining liquid temperature during a predetermined time period $t_{13}$ after a lapse of the time period $t_{13}$.
[Step SA09] A second remaining time $t_{15}$ left before the beginning of operation is calculated.
[Step SA10] Decision is made whether or not time $t_{14}$ is equal to or greater than $t_{15}$; if equal to or greater than $t_{15}$ ($t_{14} \leq t_{15}$) (decision YES), the process proceeds to Step SA11; if smaller than $t_{15}$ ($t_{14} < t_{15}$) (decision NO), the process proceeds to Step SA12.
[Step SA11] Temperature control of the machining liquid continues.
[Step SA12] Temperature control of the machining liquid is suspended for time ($t_{15}$-$t_{14}$). ($t_{15}$-$t_{14}$) is a suspension period. During the suspension period, the machining liquid temperature is controlled such that the machining liquid temperature is maintained at $T_3$.
[Step SA13] Temperature control of the machining liquid is resumed.

This flowchart will be described below in more detail.

Processing in Step SA01 corresponds to the "operation beginning time setting unit" for setting an operation beginning time at which operation of the wire electric discharge machine begins and "machining liquid temperature setting unit" for setting a control temperature of the machining liquid at the operation beginning time. Processing in Step SA03 corresponds to the "machining liquid temperature measuring unit" for measuring a temperature of the machining liquid and "ambient temperature measuring unit" for measuring an ambient temperature around the wire electric discharge machine. Processing in Step SA04 corresponds to the "temperature regulation time calculating unit" for calculating a temperature regulation time required to regulate the machining liquid temperature on the basis of the quantity of heat required to cause the temperature of the machining liquid stored in the machining liquid tank to its maximum capacity to reach the control temperature, from the measured machining liquid temperature and ambient temperature, the quantity of heat loss, and a capacity of the temperature regulator. Processing in Step SA05 corresponds to the "first remaining time calculating unit" for calculating a first remaining time left before operation beginning time, from the calculated temperature regulation time length and the time at which the temperature regulation time length is calculated.

Processing in Steps SA06 and SA07 corresponds to the "temperature regulation control starting unit" for starting temperature regulation when the temperature regulation time length becomes equal to or exceeds the first remaining time. Processing in Step SA08 corresponds to the "temperature regulation time recalculating unit" for determining a rate of change of the machining liquid temperature by measuring a machining liquid temperature after a predetermine time elapses since the temperature regulation control starting unit starts temperature regulation and then recalculating the time required to reach the control temperature from the rate of change of the machining liquid temperature. Processing in Step SA09 corresponds to the "second remaining time calculating unit" for calculating a second remaining time left before the operation beginning time since the time at which the temperature regulation time recalculating unit calculates the recalculated temperature regulation time.

Processing in Steps SA10 and SA12 corresponds to the "temperature regulation suspending unit" for setting a time for resuming temperature regulation after suspending temperature regulation for a difference between the second remaining time and the recalculated temperature regulation time when the recalculated temperature regulation time is shorter than the second remaining time.

(Second Method)

The temperature control of the machining liquid according to second method does not use a room temperature sensor 9 for measuring the machine's ambient temperature. Temperature change of the machining liquid by this temperature control procedure will be described with reference to FIG. 2, similarly to the description of the first method.

To start preparation for reactivation at an ideal timer start time $t_{5b}$, a human operation beginning time $t_2$ is preset. A table of time lengths required to fill the gap between the machining liquid control temperature of the machining liquid and the actual machining liquid temperatures is prepared in advance (i.e., the table is stored in the storage memory 7 in FIG. 1). This table includes as data the quantities of heat corresponding to the differences between the machining liquid control temperature and the temperatures of the machining liquid, stored in the machining liquid tank 3 up to its maximum storage capacity, as well as the quantities of heat (loss) corresponding to the differences between the machining liquid temperature at the preparation-for-reactivation start time $t_{5b}$ and the machining liquid temperatures during the preparation-for-reactivation period. This eliminates the need to use the machine's ambient temperature information from the room temperature sensor 9.

From the preset operation beginning time and the table listing the relationships between the differences between the machining liquid control temperature of the machining liquid and the actual machining liquid temperatures and the time lengths required to eliminate these temperature differences, a preparation-for-reactivation start time $t_{5b}$ for causing the machining liquid to reach the machining liquid control temperature at the operation beginning time $t_2$ is determined. With this, machining can be started without wasting electric power immediately after the operation begins.

It is noted that the time lengths required to eliminate the temperature differences in the above table are the time lengths required to eliminate the difference between the machining liquid control temperature and the actual temperatures of the maximum amount of machining liquid. When the actual amount of machining liquid is less than the maximum amount of machining liquid, the control target temperature (the machining liquid control temperature $T_2$) would be reached before the human operation beginning time $t_2$. In this case, electric power would be wasted until the machine is activated since the machining liquid temperature reaches the machining liquid control temperature $T_2$. Here, to avoid such wasteful power consumption, the machining liquid temperature control start time is set again by determining from the table the temperature difference between the machining liquid control target temperature $T_2$ and the actual temperature of the machining liquid (i.e., the temperature of the machining liquid measured by the machining liquid temperature detecting sensor 5) at a predetermined time after the temperature control of the machining liquid is started and the time required to eliminate this temperature difference (i.e., the time required to cause the actual machining liquid temperature to reach the machining liquid control temperature $T_2$).

In this case, however, it is predicted that the amount of machining liquid is not the maximum, because the temperature is changing faster than the time listed in the table. Accordingly, the machining liquid temperature would change faster than the time referenced again in the table. In this case, by determining at predetermined time intervals the difference between the control target temperature and the actual temperature of the machining liquid and obtaining the required time from the table, the machining liquid control temperature can be reached without wasting electric power. As described above, the second method does not need a sensor for measuring the machine's ambient temperature.

In the foregoing, the machining liquid temperature in the inactive state is lower than the control temperature; when the machining liquid temperature in the inactive state is higher than the control temperature, temperature control is performed similarly to the above description, but a cooler is used instead as the temperature regulator to take heat from machining liquid.

Figure 4A:
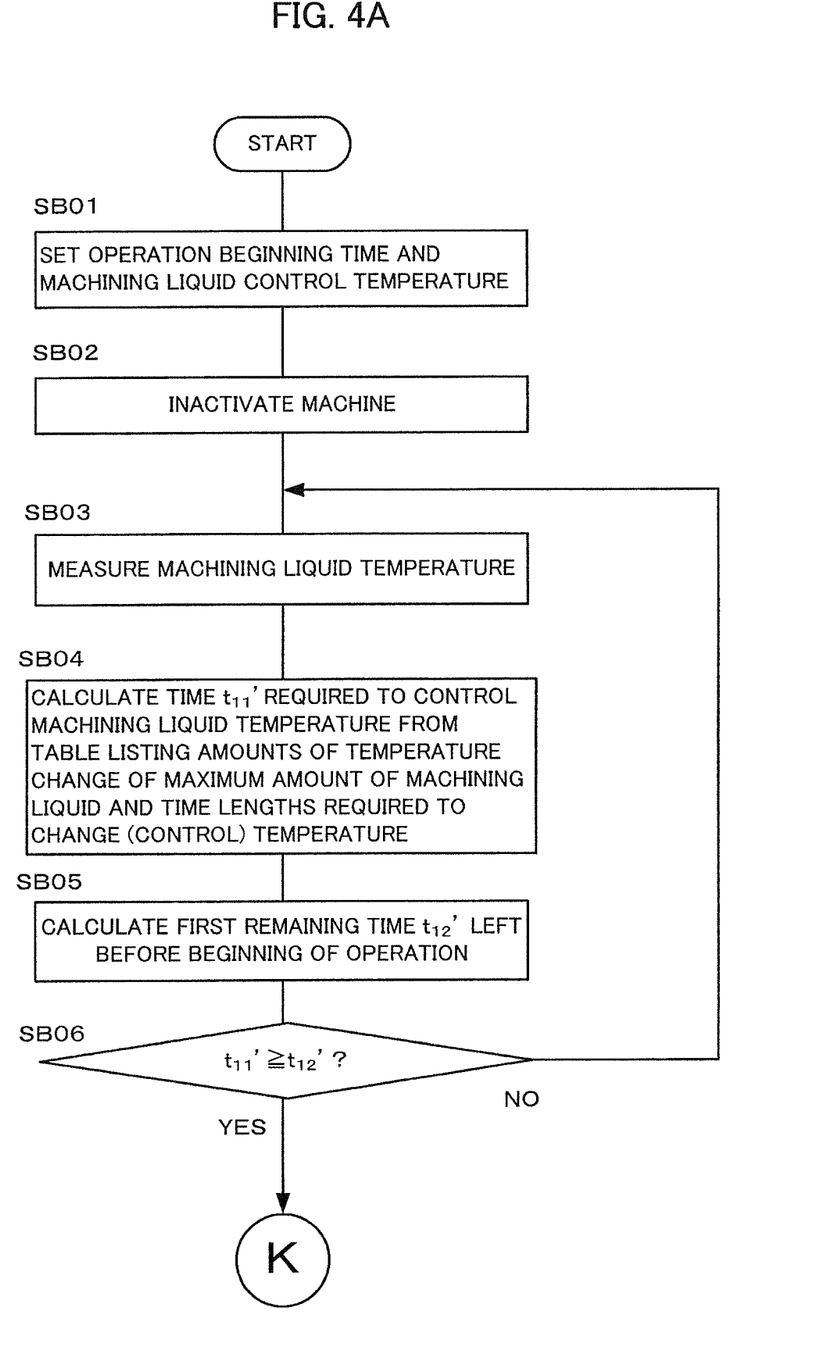
FIGS. 4A and 4B are flowcharts illustrating the procedure according to a second method for controlling the machining liquid temperature.
Figure 4B:
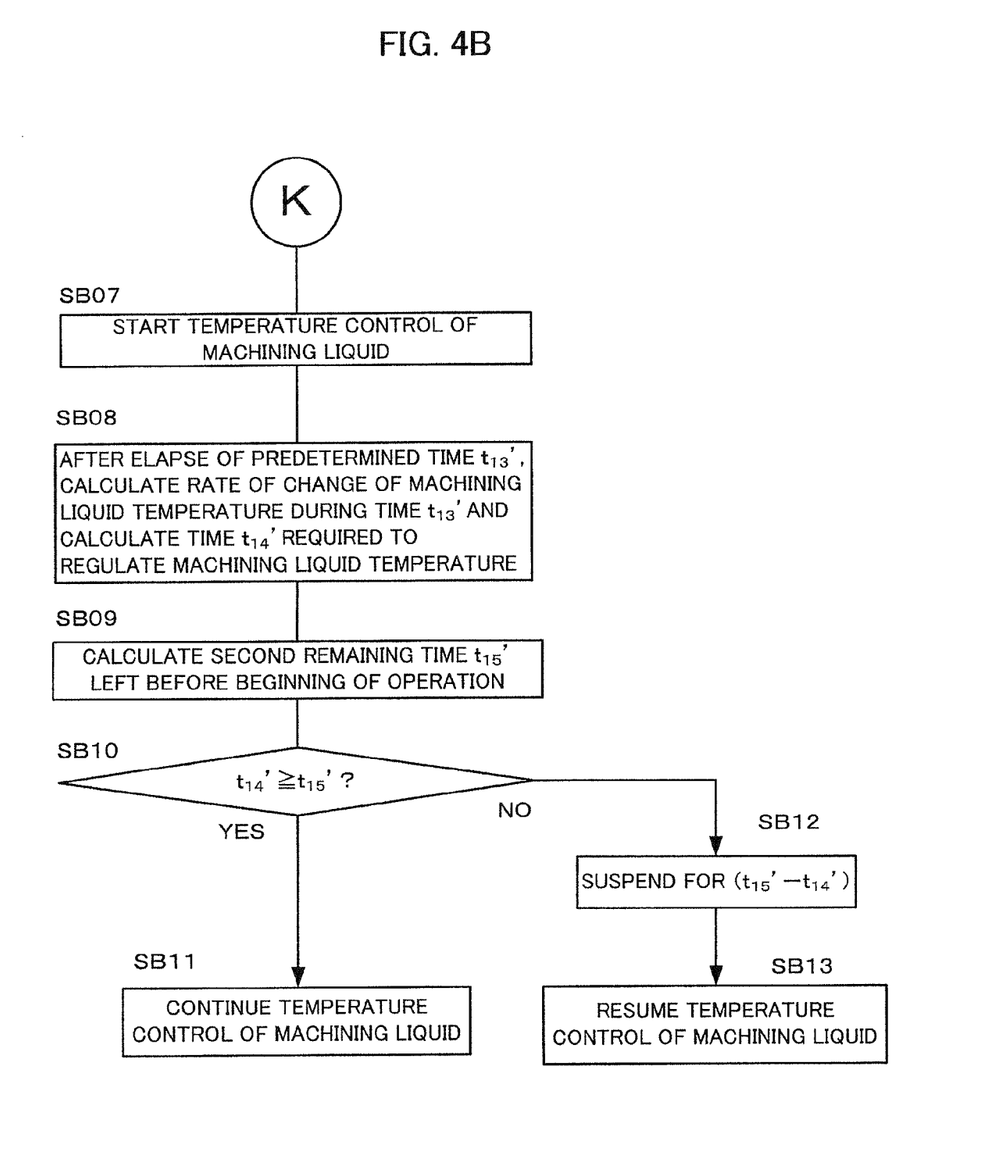

FIG. 4 is a flowchart illustrating a procedure for controlling the machining liquid temperature according to the second method. Description will be given below in the order of steps.

[Step SB01] An operation beginning time is set. The operation beginning time is input, for example, by an operator etc. through an input unit of the wire electric discharge machine and is read in and set by the machining liquid temperature controller. A machining liquid control temperature is also set.

[Step SB02] The machine is inactivated. The machining liquid temperature controller stops controlling the machining liquid temperature.

[Step SB03] The machining liquid temperature is measured and data of the machining liquid temperature is obtained. The machining liquid temperature is measured using the machining liquid temperature detecting sensor 5.

[Step SB04] Assuming that the amount of machining liquid is the maximum, the time $t_{11}'$ required to regulate the machining liquid temperature (i.e., the time required to cause the machining liquid temperature to reach the machining liquid control temperature set in Step SB01) is calculated using data from the table.

[Step SB05] A first remaining time $t_{12}'$ left before the beginning of operation is calculated.

[Step SB06] If the first remaining time $t_{12}'$ becomes equal to or less than time $t_{11}'$ ($t_{11}' \geq t_{12}'$) (decision YES), the process proceeds to Step SB07; if not equal to or less than the time $t_{11}'$ ($t_{11}' < t_{12}'$) (decision NO), the process returns to Step SB03. If $t_{11}' < t_{12}'$ (decision NO), the process may return to Step SB03 after a predetermined time elapses, to reduce the number of calculations of time lengths $t_{11}'$, $t_{12}'$.

[Step SB07] The temperature control (i.e., regulation) of the machining liquid is started.

[Step SB08] To check the controlled state of the machining liquid temperature after a predetermine time $t_{13}'$ elapses, the rate of change of the machining liquid temperature during the time $t_{13}'$ is calculated and the time $t_{14}'$ required to regulate the machining liquid temperature is calculated.

[Step SB09] A second remaining time $t_{15}'$ left before the beginning of operation is calculated.

[Step SB10] Decision is made whether or not $t_{14}'$ is equal to or greater than $t_{15}'$; if equal to or greater than $t_{15}'$ ($t_{14}' \geq t_{15}'$) (decision YES), the process proceeds to Step SB11; if less than $t_{15}'$ ($t_{14}' < t_{15}'$) (decision NO), the process proceeds to Step SB12.
[Step SB11] The temperature control of the machining liquid continues.
[Step SB12] The temperature control of the machining liquid is suspended for time ($t_{15}'-t_{14}'$). ($t_{15}'-t_{14}'$) is a suspension period. During the suspension period, the machining liquid temperature is controlled such that the machining liquid temperature is maintained at $T_3$.
[Step SB13] The temperature control of the machining liquid is resumed.

This flowchart will be described below in more detail.

Processing in Step SB01 corresponds to the "operation beginning time setting unit" for setting an operation beginning time at which the operation of the wire electric discharge machine begins and "machining liquid temperature setting unit" for setting a control temperature of the machining liquid at the operation beginning time. Processing in Step SB03 corresponds to the "machining liquid temperature measuring unit" for measuring the machining liquid temperature. Processing in Step SB04 corresponds to the "temperature regulation time calculating unit" for calculating a temperature regulation time required for temperature regulation on the basis of the measured machining liquid temperatures and the table storing the time lengths. Processing in Step SB05 corresponds to the "first remaining time calculating unit" for calculating a first remaining time left before the beginning of operation, from the calculated temperature regulation time and the time at which the temperature regulation time is calculated.

Processing in Steps SB06 and SB07 corresponds to the "temperature regulation control starting unit" for starting temperature regulation when the temperature regulation time becomes equal to or exceeds the remaining time. Processing in Step SB08 corresponds to the "temperature regulation time recalculating unit" for determining a rate of change of the machining liquid temperature by measuring the machining liquid temperature after a second predetermined time elapses since the temperature regulation control starting unit starts temperature regulation and then recalculating a time required to reach the control temperature from this rate of change. Processing in Step SB09 corresponds to the "second remaining time calculating unit" for calculating a second remaining time left before the beginning of operation since the time at which the temperature regulation time recalculating unit calculates the recalculated temperature regulation time.

Processing in Steps SB10 and SB12 corresponds to the "temperature regulation suspending unit" for setting a time for resuming temperature regulation after suspending temperature regulation for a difference between the second remaining time and the recalculated temperature regulation time when the recalculated temperature regulation time is shorter than the second remaining time.

The invention claimed is:
1. A wire electric discharge machine having a function for controlling a machining liquid temperature, for machining a workpiece to a desired shape by circulating machining liquid between a machining liquid tank and a machining vessel, generating electric discharge by applying a voltage across a machining gap between a wire electrode and the workpiece immersed in the machining liquid stored in the machining vessel while changing a relative position of the wire electrode with respect to the workpiece, said wire electric discharge machine comprising:

a heater and a cooler configured to regulate the machining liquid temperature of the machining liquid in the machining liquid tank;
a machining liquid temperature detecting sensor configured to measure the machining liquid temperature;
an ambient temperature detecting sensor configured to measure an ambient temperature around the wire electric discharge machine; and
a controller coupled to the heater and the cooler, the machining liquid temperature detecting sensor and the ambient temperature detecting sensor, the controller comprising a processor and a storage memory, the storage memory configured to store data to control the machining liquid temperature, the data including
an operation beginning time, the operation beginning time being the time at which operation of the wire electric discharge machine begins; and
a control temperature of the machining liquid at the operation beginning time;
wherein the controller is configured to:
calculate a temperature regulation time period required to regulate the machining liquid temperature
on the basis of a quantity of heat required to cause the temperature of the machining liquid, stored in the machining liquid tank up to its maximum capacity, to reach the control temperature, and
from the measured machining liquid temperature and the measured ambient temperature around the wire electric discharge machine, a quantity of heat loss, and a capacity of the heater and the cooler to be used for the temperature regulation, and
calculate a first remaining time period from (i) a time at which the temperature regulation time period is calculated to (ii) the operation beginning time stored in the storage memory;
wherein the heater and the cooler are configured to start the temperature regulation of the machining liquid temperature when the calculated temperature regulation time period becomes equal to or exceeds the first remaining time period;
wherein the machining liquid temperature detecting sensor is configured to measure a machining liquid temperature after a predetermine time elapses since the start of the temperature regulation;
wherein the controller is further configured to:
determine a rate of change of the machining liquid temperature from the machining liquid temperature measured after the predetermine time elapses since the start of the temperature regulation,
recalculate the temperature regulation time period required to reach the control temperature from the determined rate of change of the machining liquid temperature, and
calculate a second remaining time period left from (i) a time at which the temperature regulation time period is recalculated to (ii) the operation beginning time stored in the storage memory; and
wherein, when the recalculated temperature regulation time period is shorter than the second remaining time period, the controller is further configured to control the heater and the cooler to:
suspend the temperature regulation of the machining liquid temperature for a time period corresponding to a difference between the second remaining time period and the recalculated temperature regulation time period, and then resume the temperature regulation of the machining liquid temperature; and wherein, when the recalculated temperature regulation time period is not shorter than the second remaining time period, the controller is further configured to control the heater and the cooler to continue the temperature regulation of the machining liquid temperature.

2. A wire electric discharge machine having a function for controlling a machining liquid temperature, for machining a workpiece to a desired shape by circulating machining liquid between a machining liquid tank and a machining vessel, generating electric discharge by applying a voltage across a machining gap between a wire electrode and the workpiece immersed in the machining liquid stored in the machining vessel while changing a relative position of the wire electrode with respect to the workpiece, said wire electric discharge machine comprising:

a heater and a cooler configured to regulate a machining liquid temperature of the machining liquid in the machining liquid tank;

a machining liquid temperature detecting sensor configured to measure the machining liquid temperature;

a controller coupled to the heater and the cooler and the machining liquid temperature detecting sensor, the controller comprising a processor and a storage memory configured to store data to control the machining liquid temperature, the data including an operation beginning time, the operation beginning time being the time at which operation of the wire electric discharge machine begins, and a control temperature of the machining liquid at the operation beginning time;

wherein the storage memory includes a table storage section configured to store a table listing time lengths required for regulating the machining liquid temperature, the machining liquid stored in the machining liquid tank to its maximum capacity, until the control temperature is reached, wherein the controller is configured to:

calculate a temperature regulation time period required to regulate the machining liquid temperature on the basis of the measured machining liquid temperature and the table;

calculate a first remaining time period from (i) a time at which the temperature regulation time period is calculated to (ii) the operation beginning time stored in the storage memory, wherein the heater and the cooler are configured to start the temperature regulation of the machining liquid temperature when the calculated temperature regulation time period becomes equal to or exceeds the first remaining time period;

wherein the machining liquid temperature detecting sensor is configured to measure a machining liquid temperature after a predetermine time elapses since the start of the temperature regulation;

wherein the controller is further configured to:

determine a rate of change of the machining liquid temperature from the machining liquid temperature measured after the predetermine time period elapses since the start of the temperature regulation, recalculate the temperature regulation time period required to reach the control temperature from the determined rate of change of the machining liquid temperature, and calculate a second remaining time period from (i) a time at which the temperature regulation time period is recalculated to (ii) the operation beginning time stored in the storage memory; and wherein, when the recalculated temperature regulation time period is shorter than the second remaining time period, the controller is further configured to control the heater and the cooler to:

suspend temperature regulation of the machining liquid temperature for a time period corresponding to a difference between the second remaining time period and the recalculated temperature regulation time period, and then resume the temperature regulation of the machining liquid temperature; and wherein, when the recalculated temperature regulation time period is not shorter than the second remaining time period, the controller is further configured to control the heater and the cooler to continue the temperature regulation of the machining liquid temperature.

\* \* \* \* \*